(No Model.)

J. C. COUCH.
HAY PRESS.

No. 587,709.

2 Sheets—Sheet 1.

Patented Aug. 10, 1897.

Witnesses
Wm. J. Doyle
J. A. Wilson

Inventor
John C. Couch.
By H. B. Willson
Attorney (No Model.)  2 Sheets—Sheet 2.
J. C. COUCH.
HAY PRESS.

No. 587,709. Patented Aug. 10, 1897.

Witnesses  
Wm. Y. Doyle.  
J. A. Willson.

Inventor  
John C. Couch.  
By H. B. Willson.  
Attorney

UNITED STATES PATENT OFFICE.

JOHN CALVIN COUCH, OF BROWNWOOD, TEXAS.

HAY-PRESS.

SPECIFICATION forming part of Letters Patent No. 587,709, dated August 10, 1897.

Application filed August 5, 1896. Serial No. 601,728. (No model.)

*To all whom it may concern:*

Be it known that I, JOHN CALVIN COUCH, a citizen of the United States, residing at Brownwood, in the county of Brown and State of Texas, have invented certain new and useful Improvements in Hay-Presses; and I do declare the following to be a full, clear, and exact description of the invention, such as will enable others skilled in the art to which it appertains to make and use the same.

My invention has relation to improvements in hay-presses, and the object is to provide a simple, durable, and effective press of this kind; and to this end the novelty consists in the construction, combination, and arrangement of the same, as will be hereinafter more fully described, and particularly pointed out in the claim.

In the accompanying drawings the same figures of reference indicate the same parts of the invention.

Figure 1:
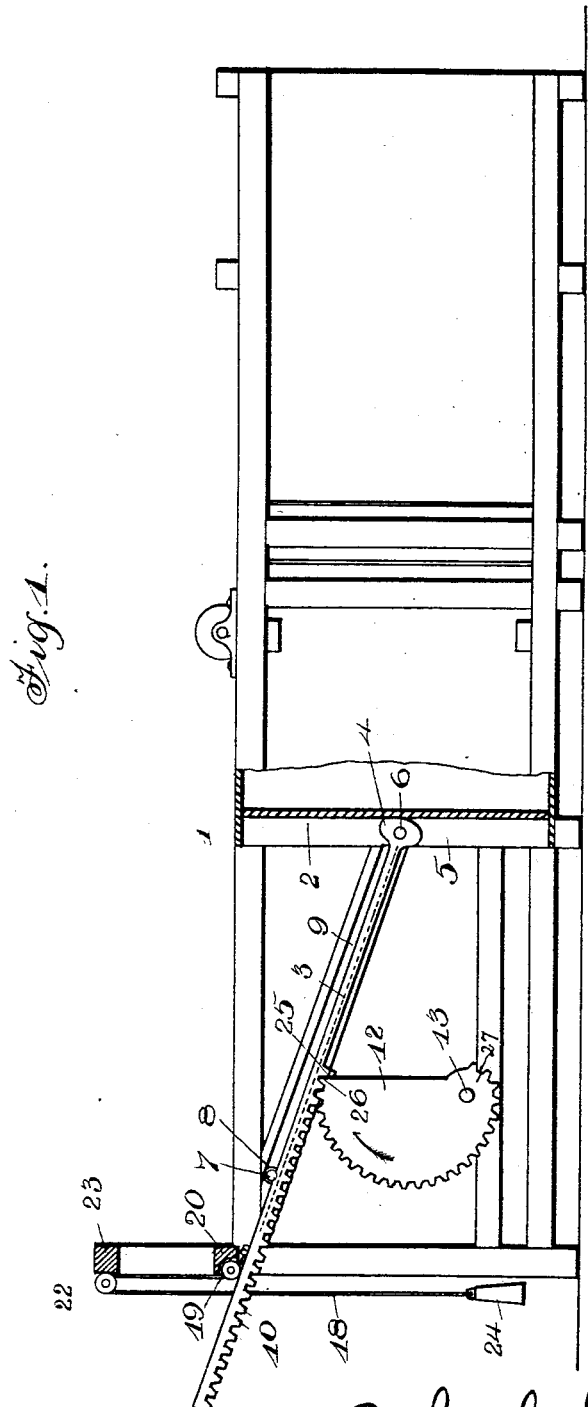
Figure 2:
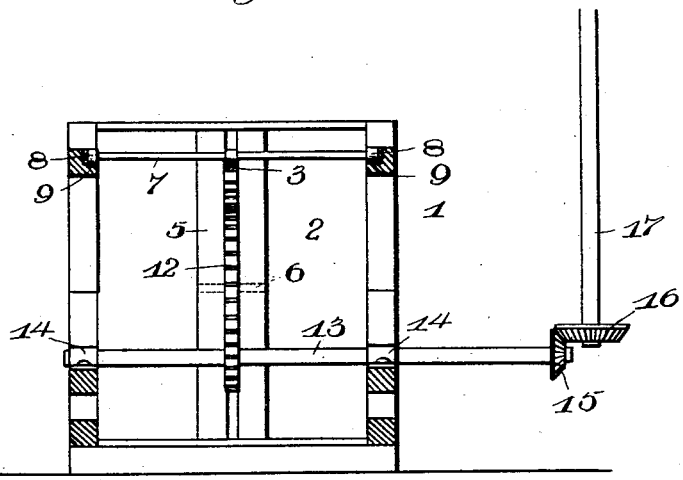
Figure 3:
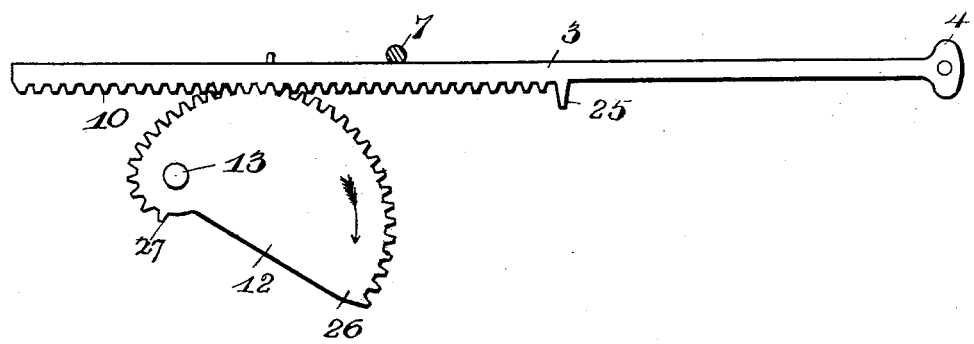

Figure 1 is a longitudinal section of my improved press. Fig. 2 is a transverse view of the same on the line of the traveling rack-brace, and Fig. 3 is an enlarged detail of the rack-bar and its semicircular toothed sector-gear.

1 represents the press proper, and 2 the reciprocating follower, both of which are of the ordinary construction.

3 is the rack-bar, formed with an enlarged head 4, secured to the follower-block 5 by a bolt 6.

7 is a transverse brace secured to the rack-bar 3, its outer ends being provided with antifriction-rollers 8 8, traveling in longitudinal slots 9 9 in the sides of the press.

The outer end of the rack-bar is formed with a series of teeth 10, which engage the teeth on the semicircular sector 12, mounted on a shaft 13, journaled in boxes 14 14, secured to the frame. The outer end of this shaft is provided with a bevel-gear 15, meshing with and driven by a similar bevel-gear 16, mounted on a vertical shaft 17, operated by an ordinary sweep, and in practice I prefer to so gear the sweep that one revolution of the gear-wheel 16 will rotate the gear-wheel 15 two revolutions. Consequently the follower 5 will make two impulses to one revolution of the sweep.

18 is a flexible cord, one end of which is attached to the outer end of the rack-bar 3, passing over a pulley 19, mounted on the transverse brace 20, thence extending vertically upward over a similar pulley 22 on the brace 23, and its lower end is provided with a weight 24, which serves to return the rack-bar and follower to the beginning of its stroke after the semicircular sector-gear has released the rack-bar at the end of its stroke.

25 is an elongated tooth on the rack-bar which is engaged by the forward end 26 of the sector-gear 12 and moves the bar forward, so that the teeth on the gear 12 will mesh with the teeth on the rack-bar.

It will be noticed that the sector-gear is mounted eccentrically on its shaft 13, so that its end 26, which first engages the rack-bar, forms the longer lever of the gear, and consequently moves the follower-block faster at the beginning of the stroke, where the least power is required, and as the pressure increases the rack-bar approaches nearer the shaft 13, and thus gradually increases the leverage on the follower-block up to the end of the stroke, where the greatest pressure is exerted.

The operation of the device is as follows: When the shaft 13 is continuously rotated in the direction of the arrow, the end 26 of the sector-gear 12 engages the teeth on the rack-bar and carries the said rack-bar and follower forward until the rear end 27 of the gear 12 passes the teeth on the rack-bar, thus releasing it, when the weight 24 draws the rack-bar and follower back with a quick movement to its first position at the beginning of the stroke, and when the end 26 of the gear 12 completes its revolution it again engages the elongated tooth 25 on the rack-bar, moving it forward to bring the teeth on the bar into proper engagement with the teeth on the sector-gear 12, and thus always insures their correct mesh or engagement.

Having thus fully described my invention, what I claim as new and useful, and desire to secure by Letters Patent of the United States, is—

In a hay-press, the combination with a follower, of a rack-bar pivoted thereto and provided with an elongated tooth 25 at its inner end, a transverse brace and guide-rod projecting laterally from said rack-bar and traveling in inclined ways or slots in the press, and an eccentrically-mounted and continuously-rotating sector-gear to engage said rack-bar to force it forward and then release it at the end of the stroke of the bar, and a weight for automatically returning said bar to its point of starting when released by the sector-gear, whereby the gear may reëngage said bar and its teeth and force it forward again.

In testimony whereof I hereunto affix my signature in presence of two witnesses.

JOHN CALVIN COUCH.

Witnesses:
I. B. SMITH,
JOHN Y. RANKIN, Sr.